United States Patent
Inoue

(10) Patent No.: US 7,524,013 B2
(45) Date of Patent: Apr. 28, 2009

(54) IMAGE FORMING APPARATUS AND NOZZLE RESTORING METHOD

(75) Inventor: Hiroshi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 344 days.

(21) Appl. No.: 11/092,546

(22) Filed: Mar. 29, 2005

(65) Prior Publication Data

US 2005/0219285 A1 Oct. 6, 2005

(30) Foreign Application Priority Data

Mar. 30, 2004 (JP) ............................. 2004-100904

(51) Int. Cl.
B41J 29/393 (2006.01)
B41J 29/38 (2006.01)
B41J 2/165 (2006.01)

(52) U.S. Cl. ................................ 347/19; 347/9; 347/23

(58) Field of Classification Search ...................... 347/9, 347/19, 23

See application file for complete search history.

(56) References Cited

U.S. PATENT DOCUMENTS

| | | | |
|---|---|---|---|
| 5,949,454 A | | 9/1999 | Nozawa et al. |
| 6,447,088 B2 * | | 9/2002 | Tachihara et al. ............. 347/15 |
| 6,637,853 B1 * | | 10/2003 | Ahne et al. .................... 347/19 |
| 6,722,751 B2 * | | 4/2004 | Barr et al. ...................... 347/19 |
| 2002/0196301 A1 | | 12/2002 | Murakami et al. |
| 2002/0196309 A1 | | 12/2002 | Murakami et al. |
| 2003/0210295 A1 * | | 11/2003 | Mitsuzawa et al. ............. 347/23 |
| 2004/0169693 A1 * | | 9/2004 | Nakamura .................... 347/19 |

FOREIGN PATENT DOCUMENTS

| | | |
|---|---|---|
| JP | 6-270400 A | 9/1994 |
| JP | 08-039805 A | 2/1996 |
| JP | 2000-190528 A | 7/2000 |
| JP | 2003-54006 A | 2/2003 |
| JP | 2003-127383 A | 5/2003 |
| JP | 2003-127439 A | 5/2003 |
| JP | 2003-205623 A | 7/2003 |

OTHER PUBLICATIONS

Patent Abstracts of Japan, Publication No. 2003-205623 (Jul. 22, 2003).*

* cited by examiner

*Primary Examiner*—Luu Matthew
*Assistant Examiner*—Jannelle M Lebron
(74) *Attorney, Agent, or Firm*—Birch, Stewart, Kolasch & Birch, LLP

(57) ABSTRACT

The image forming apparatus comprises: a liquid droplet discharge head which has a plurality of first nozzles that discharge liquid droplets onto a recording medium to perform an image recording, and has a plurality of second nozzles that discharge liquid droplets under previously established prescribed discharge conditions; a discharge determinnation device which determines a liquid droplet discharge status of the plurality of second nozzles; and a restoration control device which controls a timing at which a restoring process is carried out with respect to the plurality of first nozzles according to a determination result obtained by the discharge determination device.

8 Claims, 10 Drawing Sheets

IMAGE FORMING APPARATUS AND NOZZLE RESTORING METHOD

BACKGROUND OF THE INVENTION

1. Field of the Invention

The present invention relates to an image forming apparatus and a nozzle restoring method, and more particularly, to an image forming apparatus which records images by discharging droplets of ink or the like onto a recording medium, and a nozzle restoring method for same.

2. Description of the Related Art

Conventionally, one known example of an image forming apparatus is an inkjet recording apparatus (inkjet printer) that has an inkjet head (ink ejection head) with an alignment of multiple nozzles and that forms an image on a recording medium by ejecting ink from the nozzles while moving the inkjet head and the recording medium relative to each other.

Various methods are known in conventional practice as ink ejection methods for such an inkjet recording apparatus. Known examples include a piezoelectric system wherein a vibration plate that constitutes part of a pressure chamber (ink chamber) is deformed by the deformation of a piezoelectric element (piezoelectric ceramics), the capacity of the pressure chamber is changed, ink is led into the pressure chamber from an ink supply channel during this increase in pressure chamber capacity, and the ink in the pressure chamber is ejected as droplets during the decrease in pressure chamber capacity. Further, known examples also include a thermal inkjet system wherein ink is heated to create air bubbles for ejecting the ink by the expansion energy when the air bubbles grow.

In an image forming apparatus having an ink discharge head such as an inkjet recording apparatus, ink is supplied to an ink discharge head via an ink supply channel from an ink tank which stores ink, and this ink is discharged by one of the various discharge methods described above. However, it is necessary that ink is discharged stably in such a manner that factors such as the ink discharge volume, the discharge velocity, the discharge direction, and the three-dimensional shape of the discharged ink, conform to uniform values at all times.

However, during printing, the nozzles of the ink discharge head are filled with ink at all times, in order that printing can be performed as soon as a printing instruction is issued. Therefore, the ink in the nozzles is exposed to the air, and the ink in nozzles which do not perform discharge for a long period of time dries, the viscosity of the ink increases, and nozzle blockages may occur. Increased viscosity at the ink meniscus in a nozzle can cause ink discharge failures. Furthermore, foreign matter, such as dust or air bubbles introduced into the ink supply channels may accumulate, thus blocking the ink supply and giving rise to discharge errors.

Therefore, various means have been devised in the related art in order to eliminate ink discharge errors and discharge failures of this kind. For instance, ink of increased viscosity at the meniscus region of a nozzle which may cause an ink discharge failure is subjected to a restoring process, such a purging (dummy discharge or preliminary discharge), or suction, whereby the ink of increased viscosity is expelled forcibly to the outside of the machine, at periodic intervals.

One known example discloses a system for an inkjet head having a plurality of printing nozzles connected directly to a common ink chamber and arranged in accordance with the pixel density, a discharge energy application device being provided inside each printing nozzle. Dummy nozzles, which are connected to the common ink chamber, have a smaller flow resistance than the printing nozzles, and do not contribute to printing, are provided with respect to the printing nozzles, in such a manner that dust, air bubbles, or the like, inside the inkjet head can be expelled effectively (see, for example, Japanese Patent Application Publication No. 6-270400).

Furthermore, an example is known in which a plurality of ink discharge ports of different diameters for discharging different quantities of ink are arranged in a discharge surface, and stable ink discharge is achieved by imparting an optimal shape to the liquid-attracting portion of the ink discharge surface in accordance with the amount of ink discharged from the respective ink discharge ports (see, for example, Japanese Patent Application Publication No. 8-39805).

Moreover, an example is known in which a plurality of discharge ports for discharging ink include large-diameter discharge ports and small-diameter discharge ports, the number of small-diameter discharge ports being greater than the number of large-diameter discharge ports. Ink flow channels connected to the large-diameter discharge ports and ink flow channels connected to the small-diameter discharge ports are arranged in a mixed fashion in line with ink supply ports, and a group of a plurality of small-diameter discharge ports is disposed between respective large-diameter discharge ports. In this way, it is possible to carry out a uniform restoring process of the large-diameter discharge ports and the small-diameter discharge ports (see, for example, Japanese Patent Application Publication No. 2003-127383).

Furthermore, an example is known in which the ambient temperature and humidity of a recording head is determined, and preliminary discharge, which is a discharge that does not contribute to recording, is performed on the basis of preliminary discharge drive conditions established in accordance with the determination results (see, Japanese Patent Application Publication No. 2000-190528). In this way, stable discharge can be achieved, even in an environment subject to variations in temperature and humidity.

However, in the related art, purging (preliminary discharge) for restoring nozzles which have produced a discharge error as described above is carried out on the basis of a timer or the number of droplet ejection operations performed, but since there is variation in the timing at which a discharge failure occurs, due to the environment (temperature and humidity) in the vicinity of the nozzles, the viscosity of the ink, and the like, then the timing for implementing purging is set so as to include a certain safety margin. Therefore, purging is carried out when the ink has not yet actually increased in viscosity and when purging is not actually necessary, and this means that the frequency of the restoring process is high and ink is consumed wastefully.

In Japanese Patent Application Publication No. 6-270400, the flow channel resistance of the dummy nozzles which expel dust, air bubbles, and the like, is less than the flow channel resistance of the printing nozzles. Therefore, during suction, a greater amount of ink is expelled from the dummy nozzles, and the printing nozzles may not be restored satisfactorily, in addition to which, a large amount of ink is consumed wastefully.

Moreover, in Japanese Patent Application Publication No. 8-39805, nozzles of different diameters are arranged in order to maintain recording density, and they are not used to control restoring processes. Therefore, the frequency of restoring processes remains high and ink is consumed wastefully.

In Japanese Patent Application Publication No. 2003-127383, by forming a plurality of small-diameter discharge ports between respective large-diameter discharge ports, a restoring process is carried out uniformly with respect to the small-diameter discharge ports as well as the large-diameter discharge ports. However, similarly to Japanese Patent Application Publication No. 8-39805, frequency of restoring processes remains high and ink is consumed wastefully.

Furthermore, in Japanese Patent Application Publication No. 2000-190528, the time until a preliminary discharge (purging) operation is previously specified and there may be cases where preliminary discharge is carried out when it is not actually necessary, thus causing wasteful consumption of ink. In Japanese Patent Application Publication No. 2000-190528, the temperature and humidity of the recording head are determined, and the timing of preliminary discharge is established in accordance with these determination results. However, there also exist other environmental factors, such as the wind force that acts on the meniscus surface when the recording head is moved back and forth over the recording medium, the heat radiated from the recording medium, and the like, and hence the timing of preliminary discharge cannot be specified on the basis of the ambient temperature and humidity of the recording head alone.

SUMMARY OF THE INVENTION

The present invention has been contrived in view of the aforementioned circumstances, an object thereof being to provide an image forming apparatus and a nozzle restoring method whereby the timing at which the nozzles require a restoring process can be judged accurately, thus reducing wasteful consumption of ink due to unnecessary nozzle restoring operations, and improving productivity.

In order to attain the aforementioned object, the present invention is directed to an image forming apparatus, comprising: a liquid droplet discharge head which has a plurality of first nozzles that discharge liquid droplets onto a recording medium to perform an image recording, and has a plurality of second nozzles that discharge liquid droplets under previously established prescribed discharge conditions; a discharge determination device which determines a liquid droplet discharge status of the plurality of second nozzles; and a restoration control device which controls a timing at which a restoring process is carried out with respect to the plurality of first nozzles according to a determination result obtained by the discharge determination device.

Accordingly, since the timing of restoration of the nozzles which perform image recording can be judged by directly measuring the droplet discharge status, then it is possible to perform a restoring process only when it is truly necessary, without having to establish a restoring process timing table showing the timing at which a restoring process is to be implemented, on the basis of parameters such as the printing environment, the viscosity of the liquid droplets, and the like. Therefore wasteful consumption of liquid droplets is reduced and productivity can be improved. Here, the discharge status of the liquid droplets means the status of the liquid droplets discharged from the nozzles, the liquid droplets during flight, and the liquid droplets after landing.

Preferably, the prescribed discharge conditions include that a diameter of the plurality of second nozzles is smaller than a diameter of the plurality of first nozzles. Thereby, it is possible to make the discharge conditions more severe than those of the nozzles for image recording, and therefore the accuracy of discharge determination can be improved.

Preferably, the prescribed discharge conditions include that an amplitude of a drive waveform which drives the plurality of second nozzles is smaller than an amplitude of a drive waveform which drives the plurality of first nozzles.

Preferably, the prescribed discharge conditions include that a rise time of a drive waveform which drives the plurality of second nozzles is longer than a rise time of a drive waveform which drives the plurality of first nozzles.

Thereby, the discharge conditions can be set readily to discharge conditions which are more severe than those of the nozzles for image recording.

Preferably, the plurality of second nozzles are fewer in number than the plurality of first nozzles. Thereby, manufacture of the nozzles becomes easier, and wasteful consumption of the liquid droplets can be reduced without incurring increased costs.

Preferably, the plurality of second nozzles are not used for the image recording. Thereby, the nozzles for discharge determination which discharge under the prescribed discharge conditions can be controlled readily.

Preferably, the plurality of second nozzles discharge the liquid droplets under the prescribed discharge conditions during the image recording by the plurality of first nozzles. Thereby, it is possible to perform discharge determination for judging the timing of a restoring process, without reducing productivity.

Preferably, the plurality of second nozzles discharge the liquid droplets onto the discharge determination device under the prescribed discharge conditions. Thereby, it is possible to perform discharge determination without affecting the recorded image at all.

In order to attain the aforementioned object, the present invention is also directed to a nozzle restoring method for a plurality of image recording nozzles that discharge liquid droplets onto a recording medium to perform an image recording, and a plurality of discharge determination nozzles that discharge liquid droplets under prescribed discharge conditions, the method comprising the steps of: discharging the liquid droplets from each of the plurality of discharge determination nozzles sequentially one at a time at prescribed time intervals under the prescribed discharge conditions during the image recording by the image recording nozzles; and performing a nozzle restoring process for at least one of the plurality of image recording nozzles and the plurality of discharge determination nozzles according to a determination result of a discharge status of the discharge determination nozzles.

Thereby, it is possible to determine the timing at which a restoring process is truly required, in a reliable manner, and hence wasteful consumption of ink due to the restoring process can be reduced, and productivity can be improved.

In order to attain the aforementioned object, the present invention is also directed to a nozzle restoring method for a plurality of image recording nozzles that discharge liquid droplets onto a recording medium to perform an image recording, and a plurality of discharge determination nozzles that discharge liquid droplets under prescribed discharge conditions, the method comprising the steps of: starting discharge from each of the plurality of discharge determination nozzles sequentially one at a time at prescribed time intervals during the image recording by the image recording nozzles; causing the plurality of discharge determination nozzles that have already started discharge to continue to perform discharge at the prescribed time intervals; if one of the plurality of discharge determination nozzles that has attempted to start discharge at any part of sequence is determined to suffer a discharge failure, implementing a restoring process for the plurality of image recording nozzles and controlling a timing for implementing a restoring process for the plurality of image recording nozzles as previously by using only the discharge determination nozzles that have continued to perform discharge prior to the one of the plurality of discharge determination nozzles determined to have suffered the discharge failure; and implementing a restoring process for the plurality of discharge determination nozzles in cases where it has become impossible to determine discharge failures by means of the plurality of discharge determination nozzles.

Thereby, it is possible to perform discharge determination more efficiently by reducing the number of restoring processes for the discharge determination nozzles and using at least a portion of the discharge determination nozzles in a rotating fashion. Therefore, wasteful consumption of liquid droplets is reduced and productivity can be improved.

As described above, according to the image forming apparatus and the nozzle restoring method according to the present invention, the timing at which a restoring process is implemented for image recording nozzles is decided on the basis of the results of discharge under prescribed discharge conditions for the purpose of discharge determination. Therefore, wasteful consumption of the liquid droplets due to unnecessary restoring processes can be reduced, and productivity can be improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
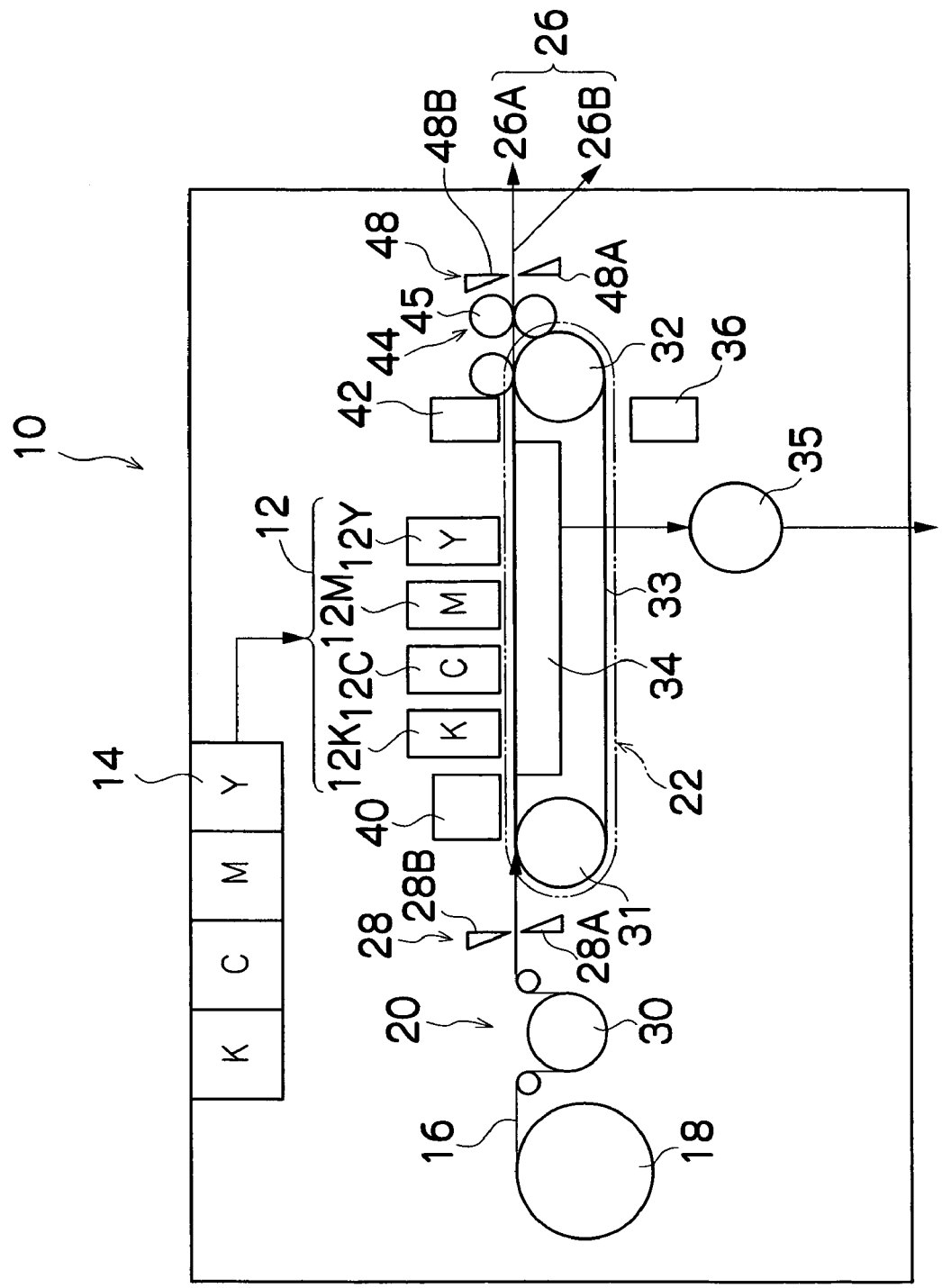
FIG. 1 is a general schematic drawing of an inkjet recording apparatus according to an embodiment of the present invention.

FIG. 1 is a general schematic drawing of an inkjet recording apparatus for forming an image by discharging inks as droplet onto a recording medium, according to an embodiment of the present invention.

As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing/loading unit 14 for storing inks to be supplied to the print heads 12K, 12C, 12M, and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; and a paper output unit 26 for outputting image-printed recording paper (printed matter) to the exterior.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is equal to or greater than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
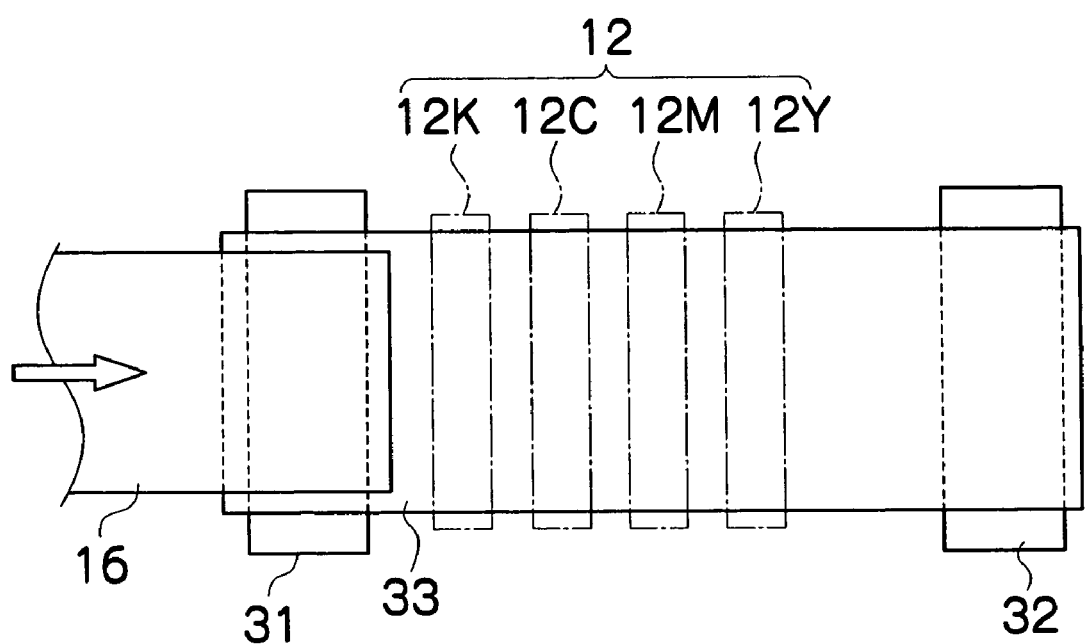
FIG. 2 is a plan view of principal components of an area around a printing unit of the inkjet recording apparatus in FIG. 1.
Figure 3:
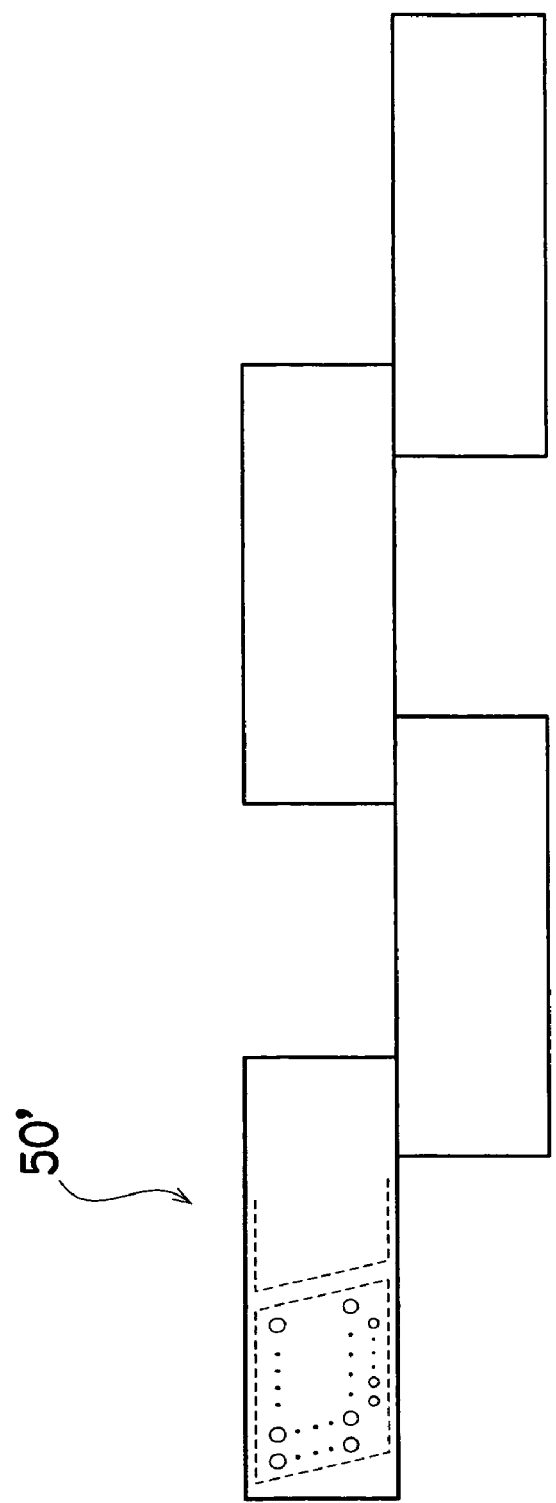
FIG. 3 is a perspective plan view showing an example of a configuration of a print head.

As shown in FIG. 2, the printing unit 12 forms a so-called full-line head in which a line head having a length that corresponds to the maximum paper width is disposed in the main scanning direction perpendicular to the delivering direction of the recording paper 16 (hereinafter referred to as the paper conveyance direction) represented by the arrow in FIG. 2, which is substantially perpendicular to a width direction of the recording paper 16.

Each of the print heads 12K, 12C, 12M, and 12Y is composed of a line head, in which a plurality of ink-droplet ejection apertures (nozzles) are arranged along a length that exceeds at least one side of the maximum-size recording paper 16 intended for use in the inkjet recording apparatus 10, as shown in FIG. 2.

Although a specific structural example is described later, each of the print heads 12K, 12C, 12M, and 12Y comprises a various devices for determining the ink discharge condition, the discharged ink-droplet size, the ink-ejecting speed, or the like (for example, a determination device for determining the ink discharge, a optical system for forming a luminous flux for determination in a desired shape, and the like).

The print heads 12K, 12C, 12M, and 12Y are arranged in this order from the upstream side along the paper conveyance direction. A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration is possible in which print heads for ejecting light-colored inks such as light cyan and light magenta are added. Moreover, a configuration is possible in which a single print head adapted to record an image in the colors of CMY or KCMY is used instead of the plurality of print heads for the respective colors.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

As shown in FIG. 1, the ink storing/loading unit 14 has tanks for storing the inks to be supplied to the print heads 12K, 12C, 12M, and 12Y, and the tanks are connected to the print heads 12K, 12C, 12M, and 12Y through channels (not shown), respectively. The ink storing/loading unit 14 has a warning device (e.g., a display device, an alarm sound generator) for warning when the remaining amount of any ink is low, and has a mechanism for preventing loading errors among the colors.

A post-drying unit 42 is disposed following the printing unit 12. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in the diagram, a sorter for collecting prints according to print orders is provided to the paper output unit 26A for the target prints.

Figure 4:
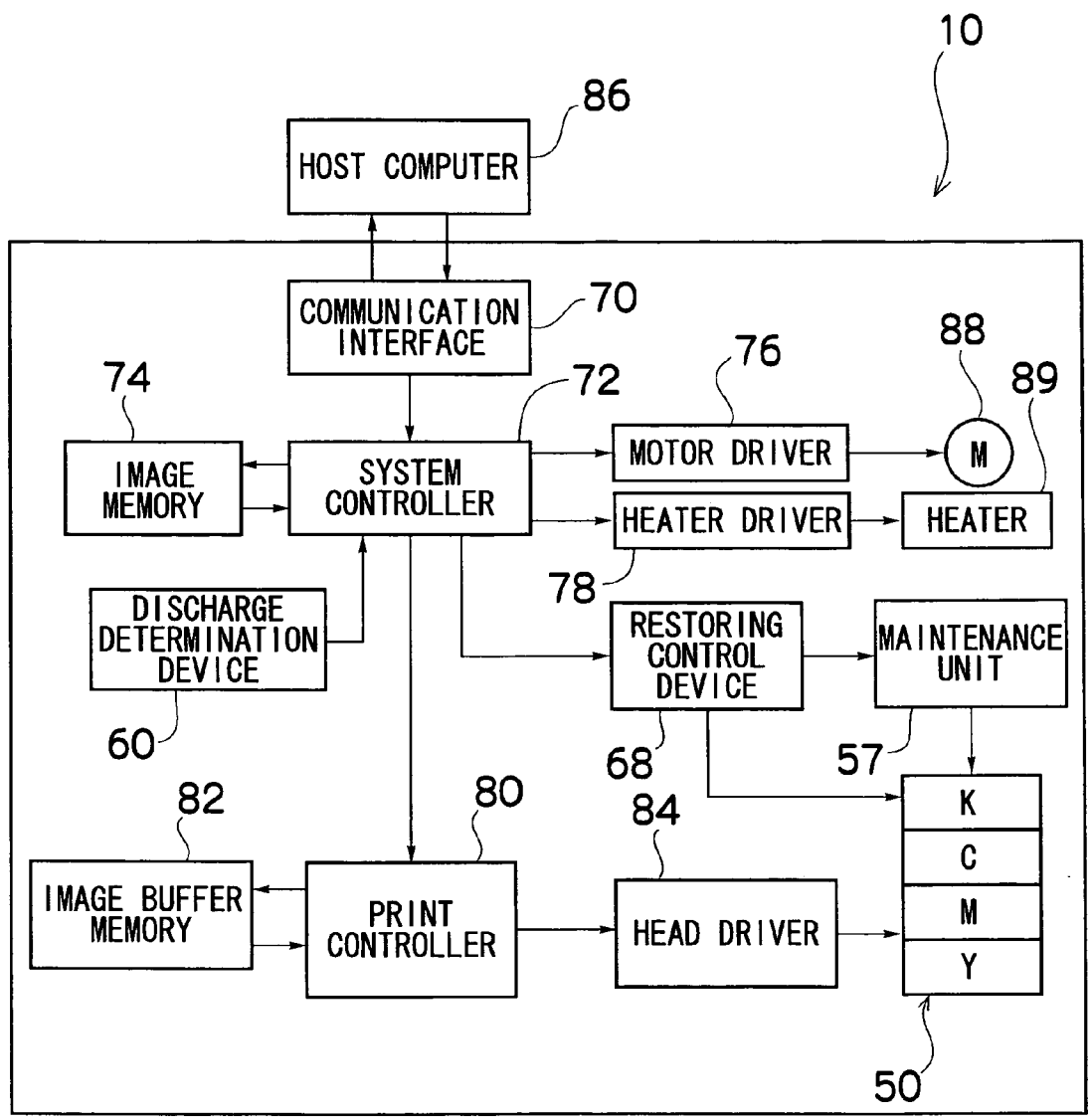
FIG. 4 is a schematic drawing showing a configuration of an ink supply system in the inkjet recording apparatus.

Thus, as shown in FIG. 2, the print heads 12K, 12C, 12M, and 12Y in the present embodiment are explained as a full-line head in which the ink-droplet ejection apertures (nozzles) are arranged in the form of a two-dimensional matrix. Alternatively, as shown in FIG. 4, a full-line head may be composed of a plurality of short two-dimensionally arrayed heads 50' arranged in the form of a staggered and combined so as to form nozzle rows having lengths that correspond to the entire width of the recording medium. In this case, the short arrayed heads 50' are applied as the nozzle arrangement of the present embodiment.

FIG. 4 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefore, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print control unit 80 is a control unit having a signal processing function for performing various treatment processes, corrections, and the like, in accordance with the control implemented by the system controller 72, in order to generate a signal for controlling printing, from the image data in the image memory 74, and it supplies the print control signal (image data) thus generated to the head driver 84. Prescribed signal processing is carried out in the print control unit 80, and the discharge amount and the discharge timing of the ink droplets from the respective print heads 50 are controlled via the head drier 84, on the basis of the image data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 4 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives an actuator for each of the print heads 12K, 12C, 12M and 12Y of the respective colors on the basis of the print data received from the print controller 80. A feedback control system for keeping the drive conditions for the print heads constant may be included in the head driver 84.

Furthermore, in the present embodiment, in addition to the composition described above, there are also provided a discharge determination device 60 which determines the discharge status of the nozzles which discharge ink under prescribed discharge conditions which are different to the discharge from the nozzles performing image recording; and a restoration control device 68 which controls the timing at which a restoration process for the nozzles performing image recording is implemented by a maintenance unit 57, on the basis of the determination results of the discharge determination device 60. The control of the restoring process by means of the discharge determination device 60 and the restoration control device 68 is described in detail below.

If the discharge determination device 60 identifies a discharge failure in a nozzle which performs discharge on the basis of prescribed discharge conditions, then it sends this determination result to the system controller 72. The system controller 72 then sends a control signal to the print head 50 and the maintenance unit 57 via the restoration control device 68 in such a manner that a restoring process is carried out.

Next, the structure of a print head will be described. The print heads 12K, 12C, 12M and 12Y provided for the respective ink colors have the same structure, and one print head 50 is described as a representative example of these print heads.

Figure 5:
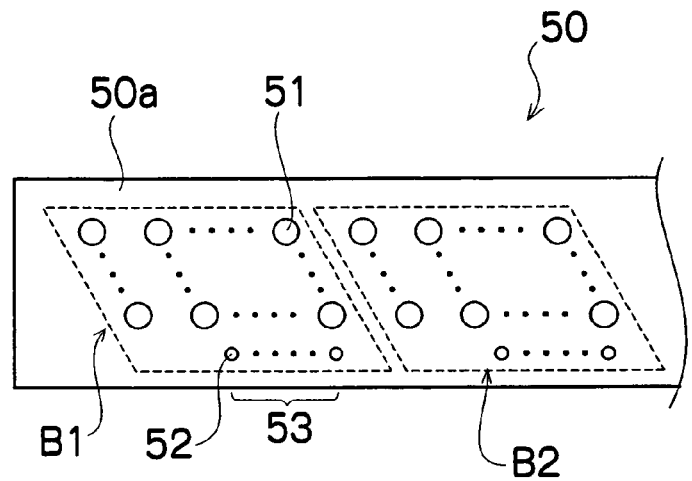
FIG. 5 is a plan diagram showing the nozzle surface of a print head according to the present embodiment.

FIG. 5 shows a print head 50. FIG. 5 is a plan view showing the nozzle surface 50a of a print head 50. On the nozzle surface 50a, provided are nozzles for image recording (main nozzles) 51 which perform image recording by discharging ink onto the recording paper 16, and nozzles for determining discharge (sub nozzles) 52 which perform discharge in accordance with previously established prescribed discharge conditions.

As shown in FIG. 5, the main nozzles 51 are arranged in a staggered two-dimensional matrix configuration. The main nozzles 51 are formed into blocks, namely, a first block B1, a second block B2, . . . or the like, corresponding to each common flow channel which supplies to ink. Forming the nozzles into blocks corresponding to each of the ink common flow channels in this way serves to increase processing efficiency since it allows restoring processes, such as purging or suction, to be implemented respectively, for each common flow channel.

Furthermore, a plurality of (M) sub nozzles 52, fewer in number than the main nozzles 51, are provided respectively in each block (B1, B2, . . . ), being arranged in a row as indicated by reference numeral 53 in the diagram. The sub nozzles 52 are used to judge the restoration timing by purging for the main nozzles 51, and they must be set to more severe discharge conditions than those of the main nozzles 51, in such a manner that discharge failure occurs in the sub nozzles 52 before the main nozzles 51.

In general, if the nozzle diameter is small, then discharge failure becomes more liable to occur, due to the effects of increased viscosity at the meniscus. In the present embodiment, the discharge conditions of the sub nozzles 52 are made more severe than those of the main nozzles 51 by setting the nozzle diameter of the sub nozzles 52 to be smaller than the nozzle diameter of the main nozzles 51. Therefore, provided that discharge for the purposes of discharge determination can be performed from the sub nozzles 52 having severe discharge conditions, it is not necessary to perform a restoring process (purging) of the main nozzles 51.

Apart from reducing the diameter of the nozzles, severe discharge conditions may also be created by, for example, reducing the amplitude of the drive waveform which drives the sub nozzles 52, in comparison with the drive waveform used to drive the main nozzles 51, or increasing the rise time of the drive waveform of the sub nozzles 52 in comparison with that of the main nozzles 51. Furthermore, discharge failure due to the increased viscosity is more liable to occur in nozzles that have not been used, and therefore it is desirable for the sub nozzles 52 to be nozzles which are not used in discharge for image recording, since this means that even more severe conditions can be created.

Consequently, rather than providing sub nozzles 52 for discharge determination in addition to the main nozzles 51 for image recording, it is also possible to use a portion of the main nozzles 51 as nozzles for discharge determination by reducing the amplitude of the drive waveform applied to the nozzles to an amplitude below that applied during normal discharge for image recording, or the like. (This portion of main nozzles 51 may be main nozzles 51 which are not to be used during the current image recording, according to the image data).

Furthermore, in the example shown in FIG. 5, one row of M sub nozzles 52 is arranged with respect to each block B1, B2, etc., but the number of sub nozzles 52 is not limited to this. For example, as described below, it is also possible to take M sub nozzles 52 as one set and to provide a plurality of sets (for instance, N sets, as described below), each including M sub nozzles 52, in each block B1, B2, . . . .

Figure 6:
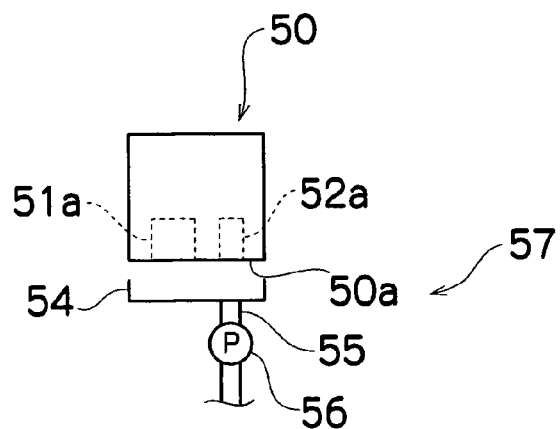
FIG. 6 is an illustrative diagram showing the relationship between a print head and a maintenance unit.

FIG. 6 shows a situation during a restoring process. FIG. 6 is a view of a print head 50 during a restoring process, as observed in side view (observed in the leftward direction in FIG. 5, for example). As shown in FIG. 6, a main nozzle section 51a comprising main nozzles 51 (not illustrated in FIG. 6), and a sub nozzle section 52a comprising sub nozzles 52 (not illustrated in FIG. 6) are provided on the nozzle surface 50a of the print head 50.

A maintenance unit 57 is disposed with respect the nozzle surface 50a, and the maintenance unit 57 comprises a cap 54 for covering the nozzle surface 50a of the print head 50, and a suction pump 56 for suctioning ink of increased viscosity from the main nozzle section 51a and the sub nozzle section 52a, via a suction port 55.

The maintenance unit 57 is disposed in a separate position to the position of the print head 50 when performing normal image recording, and during maintenance (restoration processing), image recording is interrupted and the print head 50 is moved to the position of the maintenance unit 57 in such a manner that the cap 54 is positioned immediately below the nozzle surface 50a. When performing purging as a restoring process, the purging (preliminary discharge) is carried out from the main nozzles 51 or sub nozzles 52 toward the cap. Furthermore, when performing suctioning, the nozzle surface 50a is covered with the cap 54, and ink of increased viscosity is suctioned from the main nozzles 51 and the sub nozzles 52 by means of the suction pump 56. In this case, since the sub nozzles 52 have a smaller diameter than the main nozzles 51, it may not be possible to suction the ink of increased viscosity from the sub nozzles 52, due to the difference in the resistance of the nozzle flow channels. Therefore, desirably, the suction port 55 which is connected to the suction pump 56 is disposed directly below the sub nozzle section 52a as shown in FIG. 6.

Furthermore, since the sub nozzles 52 have more severe discharge conditions, such as a smaller nozzle diameter, than the main nozzles 51, they are more liable to suffer discharge failure than the main nozzles 51. If all of the sub nozzles 52 enter a discharge failure status, then it becomes impossible to determine the timing of a restoring process for the main nozzles 51, and therefore, desirably, it is possible to carry out a restoring process with respect to the sub nozzles 52 only.

Figure 7:
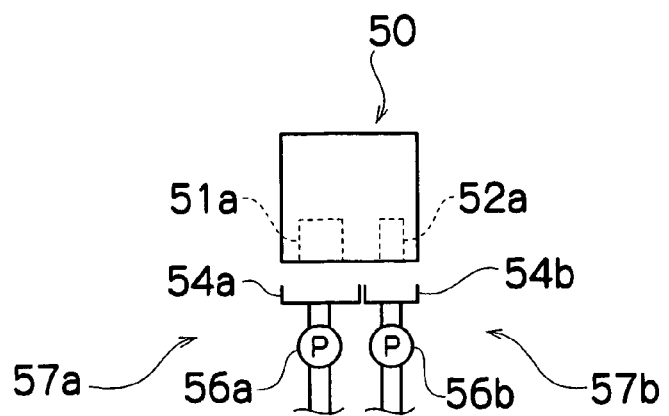
FIG. 7 is a further illustrative diagram showing the relationship between a print head and a maintenance unit.

If a sub nozzle 52 suffers a discharge failure, then it may not be possible to restore the nozzle by purging. In such cases, desirably, it should be possible to suction the sub nozzles 52 only. Therefore, as shown in FIG. 7, desirably, maintenance units 57a and 57b are provided respectively for the main nozzle section 51a and the sub nozzle section 52a. In this way, ink is suctioned from the main nozzle section 51a by means of a suction pump 56a by pressing a cap 54a against the main nozzle section 51a, and ink is suctioned from the sub nozzle section 52a by a suction pump 56b, separately from the main nozzle section 51a, by pressing a cap 54b against the sub nozzle section 52a.

Next, a method of determining the discharge from the sub nozzles 52 under the prescribed severe discharge conditions (the discharge for discharge determination), and identifying the discharge status of the sub nozzles 52, will be described.

Figure 8:
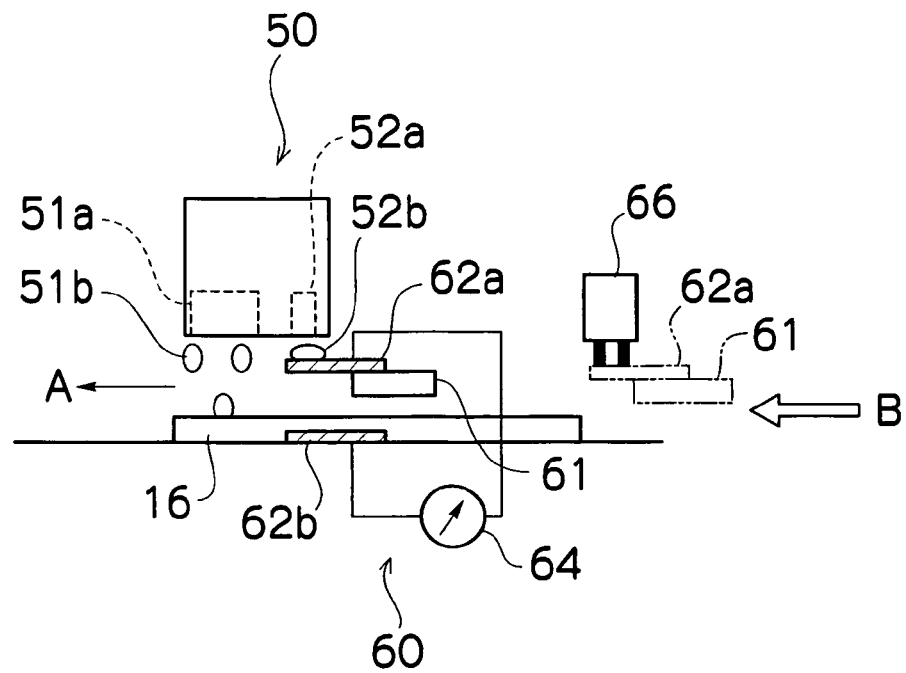
FIG. 8 is an illustrative diagram showing an aspect of discharge determination according to the present embodiment.

FIG. 8 shows a situation during discharge determination. The print head 50 in FIG. 8 is a side view of a print head 50, similarly to FIG. 6 and FIG. 7. The recording paper 16 is conveyed from right to left as indicated by arrow A in the diagram, below the print head 50. Ink droplets 51b are discharged from the main nozzle section 51a onto the recording paper 16.

On the other hand, an ink droplet 52b for discharge determination is discharged from the sub nozzle section 52a onto an electrode plate 62a disposed on a determination base plate 61 which forms the discharge determination device 60. Here, an electrode 62b is also disposed on the side corresponding to the recording paper 16, immediately below the electrode plate 62a, and the change in the electrostatic capacitance between the electrodes 62a and 62b caused by the ink droplet 52b is determined by a determination circuit 64 of the discharge determination device 60. Thereby, the presence or absence of ink discharge can be determined. Consequently, if ink discharge is not determined by the determination circuit 64, then it is judged that the relevant sub nozzle 52 is suffering a discharge failure.

Furthermore, since ink discharge is performed repeatedly from the sub nozzles 52 onto the electrode plate 62a, an electrode cleaning member 66 is provided for cleaning the electrode plate 62a. In order to clean the electrode plate 62a, the determination base plate 61 and the electrode plate 62a are moved to the position indicated by the double-dotted broken line in FIG. 8, and the ink droplets 52b adhering to the plate are wiped off by the electrode cleaning member 66.

Normally, when discharge determination is not being carried out, the determination base plate 61 and the electrode plate 62a wait at this position, and when discharge is to be determined, they are moved in the direction indicated by arrow B in the diagram, in such a manner that the electrode plate 62a enters below the sub nozzle section 52a of the print head 50.

By introducing the electrode plate 62a between the print head 50 and the recording paper 16 and discharging ink droplets onto same from the sub nozzles 52, it is possible to determine discharge from the sub nozzles 52 during an image recording operation.

The ink discharged from the sub nozzles 52 for the purposes of discharge determination does not have to be discharged onto an electrode plate 62a as described above, and since the sub nozzles 52 are of a small, barely perceptible diameter, and hence do not affect the image even if they discharge ink onto the recording paper 16, then ink discharge for discharge determination may be performed onto the recording paper 16 during image recording. However, in this case, the presence or absence of discharge must be determined by providing an optical system comprising a light source and light receiver, or the like, at a prescribed position and observing the discharged ink droplets while they are in flight.

Alternatively, a prescribed test pattern may be printed onto the recording paper 16 by the sub nozzles 52 or the main nozzles 51, and this test pattern may be read in by a line sensor in order to determine the presence or absence of discharge. A line sensor is, for example, a sensor comprising an array of photoreceptors having a greater width than the ink discharge width (image recording width) achieved by the print head 50. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. The discharge determination performed by the line sensor includes the presence/absence of discharge, measurement of the dot size, and measurement of the dot deposition position.

Alternatively, it is also possible to move the print head 50 to a withdrawal position in such a manner that it discharges ink onto the cap 54 of the maintenance unit 57. However, if this method is adopted, then discharge determination cannot be performed during image recording, and therefore a method involving discharge onto an electrode plate 62a or onto the recording paper 16 as described above, is preferable.

The present invention specifies the timing of a restoring process (purging) for the main nozzles 51 which perform image recording by determining the discharge status of the sub nozzles 52 which perform discharge under prescribed discharge conditions that are stricter than those of the main nozzles 51.

Figure 9:
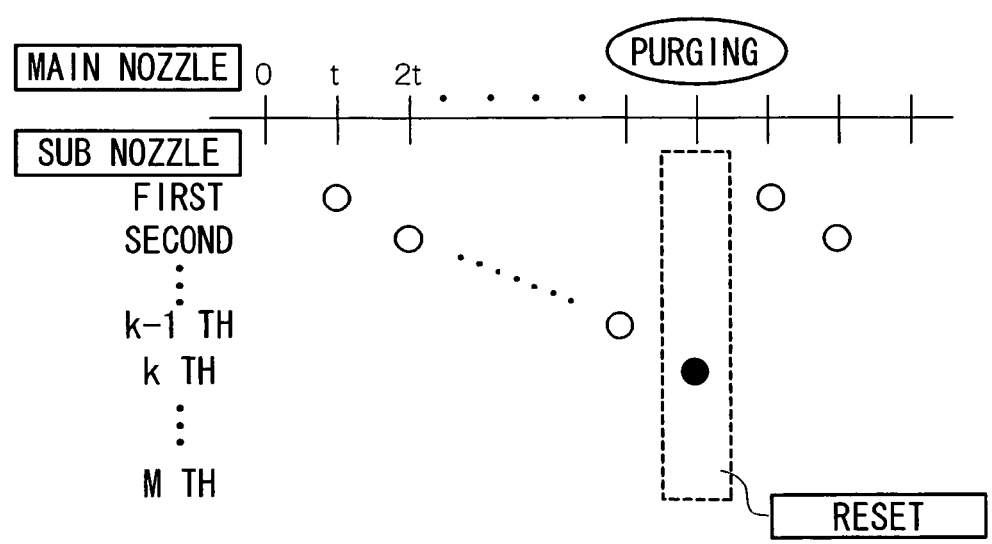
FIG. 9 is a timing chart showing an aspect of discharge determination according to a first embodiment of the present invention.
Figure 10:
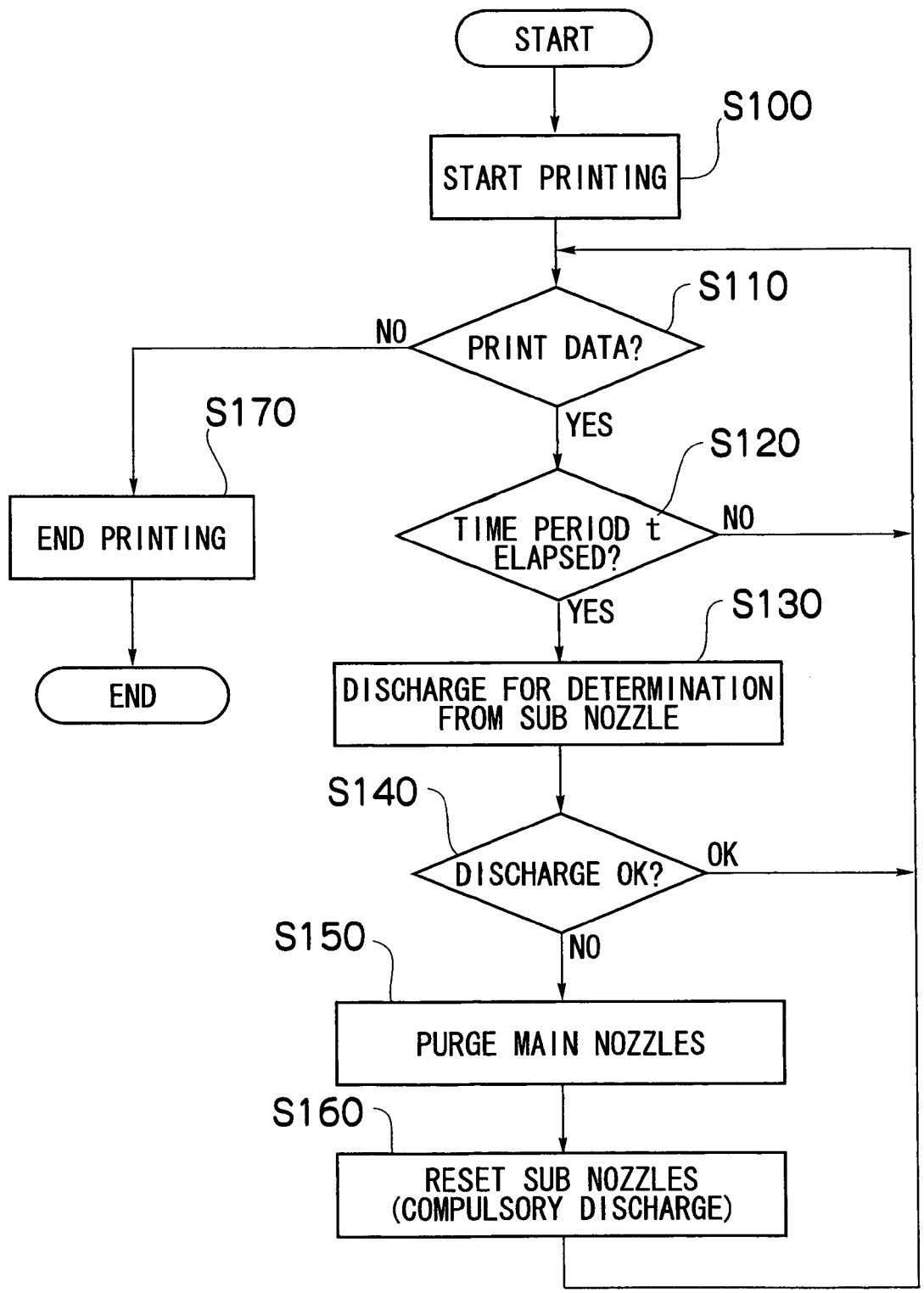
FIG. 10 is a flowchart showing the processes of a nozzle restoring method according to the first embodiment of the present invention.

FIG. 9 shows the discharge timing of the sub nozzles 52 in a nozzle restoring method relating to the first embodiment, and FIG. 10 is a flowchart showing a sequence of processes in the nozzle restoring method of the first embodiment. In FIG. 9, position 0 on the main nozzle line indicates the print start time, and t indicates the time interval at which discharge for discharge determination is performed from the sub nozzles. Furthermore, a white circle indicates a "discharge OK" status in the discharge for discharge determination from the respective sub nozzles, and a black circle indicates a discharge failure in the discharge for discharge determination.

Below, the nozzle restoring method according to the present embodiment is described with reference to FIG. 9 and FIG. 10.

Firstly, at step S100 in the flowchart in FIG. 10, printing is started. In other words, image recording is performed by means of the main nozzles 51 for image recording discharging ink toward the recording paper 16 on the basis of the image data supplied to the inkjet recording apparatus 10. The time of the start of image recording is the position 0 on the line indicating the restoring process of the main nozzles 51, at the top of FIG. 9. Thereafter, with the exception of the period corresponding to nozzle restoration processing, ink for image recording continues to be discharged from the main nozzles 51 until recording of all of the image data has been completed.

At step S110, it is judged whether or not there is any image data to be printed, and if there is still image data to be printed, then the procedure advances to the next step, S120. At step S110, it is judged whether or not a previously established prescribed time interval, t, for performing ink discharge for the purpose of discharge determination from the sub nozzles 52 has elapsed. If this prescribed time period t has not yet elapsed since the start of printing, or since the previous discharge operation for discharge determination, then the procedure returns to step S110 and image recording by the main nozzles 51 is continued.

If it is judged at step S120 that the prescribed time period, t, has elapsed, then the procedure advances to step S130, and when the period t has elapsed from the start of printing, a discharge for discharge determination is performed from a first sub nozzle 52, under the prescribed discharge conditions. This discharge is carried out onto the electrode plate 62a of the discharge determination device 60, as illustrated in FIG. 8, for example.

Next, at step S140, the determination circuit 64 of the discharge determination device 60 shown in FIG. 8 determines whether or not ink discharge from the first sub nozzle 52 has actually been performed. If it is determined that discharge has actually been performed, as indicated by a white circle at the position of time t in FIG. 9, then the procedure returns to step S110 and image recording by the main nozzles 51 is continued.

Next, at step S120, if it judged that a further time period of t has elapsed since the discharge from the first sub nozzle 52, (in other words, that a period of 2 t has elapsed from the start of printing), then at the next step S130, a discharge for discharge determination is performed from a second sub nozzle 52, when a period of 2 t has elapsed from the start of image recording. Similarly to the discharge from the first sub nozzle 52, this discharge is also performed onto the electrode plate 62a of the discharge determination device 60, and at the next step 140, the presence or absence of the discharge is determined by the determination circuit 64.

If the discharge is judged to be OK, as indicated by the white circle at the position of time period 2 t in FIG. 9, then the procedure returns again to step S110, and the same processing as the foregoing is repeated. In this way, as illustrated in FIG. 9, the discharge determination device 60 judges that discharge has been performed normally up to the k−1th sub nozzle 52, and if discharge is not determined at step S140 in the case of the subsequent sub nozzle 52 (the kth sub nozzle 52), in other words, if a discharge failure is identified as indicated by the black circle at the position of the kth sub nozzle 52 in FIG. 9, then in the following step, S150, purging is carried out as a restoring process for the main nozzles 51, as illustrated in FIG. 9. Furthermore, at the following step, S160, the sub nozzles 52 are reset to their initial state by performing a compulsory discharge of the sub nozzles 52 as illustrated in FIG. 9. More specifically, in this embodiment, it is possible to restore the sub nozzles 52 by means of compulsory discharge. This compulsory discharge may be performed by increasing the drive voltage beyond that of the normal discharge for discharge determination, or by increasing the amplitude, reducing the discharge frequency, or the like. Another possible method is to reset the sub nozzles 52 by suctioning the sub nozzles 52 only, as illustrated in FIG. 7.

After resetting the sub nozzles 52, the procedure returns again to the step S110 and image recording by the main nozzles 51 is continued, in addition to which discharge for discharge determination is performed at intervals of the prescribed time period t, starting from the first sub nozzle, similarly to the foregoing description. If it is judged at step S110 that there is no more image data (print data), then the procedure advances to step S170 and printing ends. The foregoing description relates to processing in a nozzle restoring method according to a first embodiment. According to this embodiment, it is possible to reduce unnecessary purging from the main nozzles, and hence ink can be saved and productivity can be improved.

Next, a nozzle restoring method relating to the second embodiment will be described.

Figure 11:
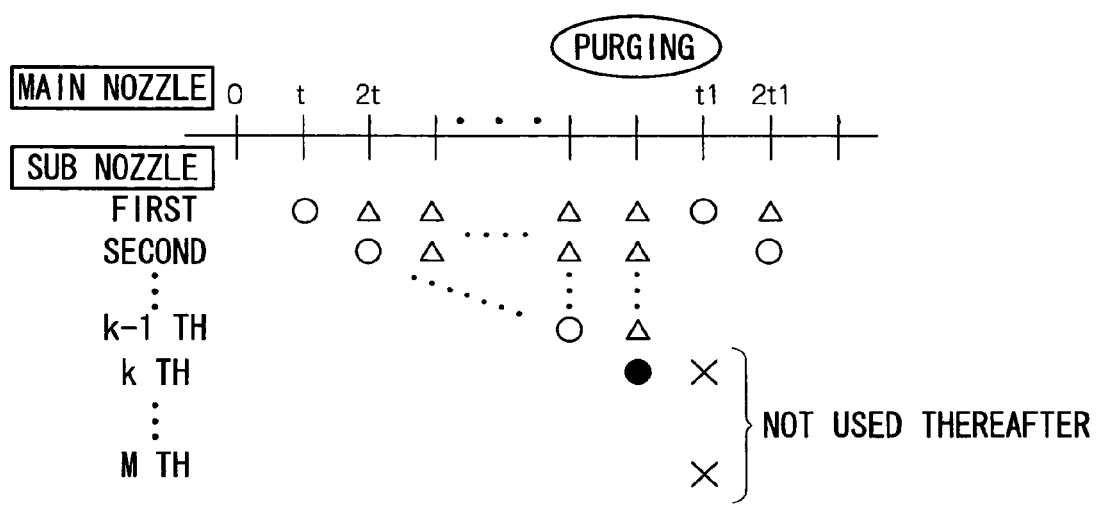
FIG. 11 is a timing chart showing an aspect of discharge determination according to a second embodiment of the present invention.
Figure 12:
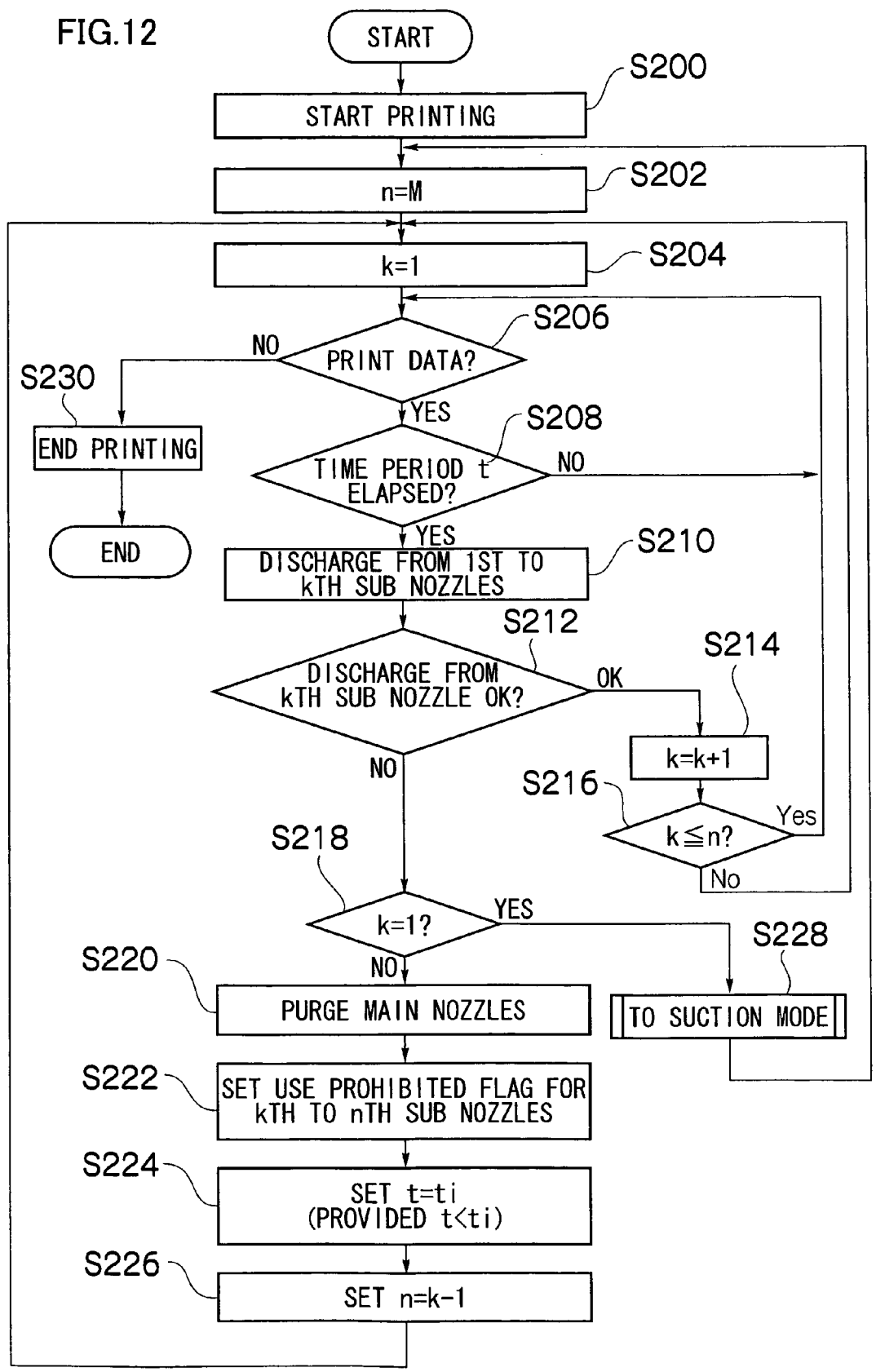
FIG. 12 is a flowchart showing the processes of a nozzle restoring method according to the second embodiment of the present invention.

FIG. 11 shows the discharge timing of the sub nozzles 52 in a nozzle restoring method relating to the second embodiment, and FIG. 12 is a flowchart showing a processing sequence in the nozzle restoring method of the second embodiment. In FIG. 11, t and t1 indicate the time interval at which discharge for discharge determination is performed from the sub nozzles 52, and similarly to FIG. 9, the white circles and black circles respectively indicate a discharge OK status and a discharge failure as a result of the discharge for discharge determination. Moreover, a white triangle indicates a simple discharge which is not used for discharge determination, and a cross symbol indicates that use of the sub nozzle 52 is prohibited (namely, it does not perform discharge, even if it is able to do so).

Below, the nozzle restoring method according to the present embodiment is described with reference to FIG. 11 and FIG. 12.

Firstly, at step S200 in the flowchart in FIG. 12, printing is started. In other words, image recording is performed by means of the main nozzles 51 for image recording discharging ink toward the recording paper 16 on the basis of the image data supplied to the inkjet recording apparatus 10. The time of the start of image recording is the 0 position on the line indicating the restoring process of the main nozzles 51, at the top of FIG. 11. Thereafter, with the exception of the period corresponding to nozzle restoration processing, ink for image recording continues to be discharged from the main nozzles 51 until recording of all of the image data has been completed.

Next, at step S202, a set number n is established which indicates the number of sub nozzles 52 that can be used for discharge determination. Initially, all of the sub nozzles 52 can be used, so the number of sub nozzles 52, M, is established as the set number, n.

Next, at step S204, an initial value 1 is set as an index k which indicates the number (sequence) of the sub nozzle 52 used in the current discharge determination operation. Thereupon, at step S206, it is judged whether or not image recording has been completed, in other words, whether or not there still remains data that is to be printed. If there is still print data, then the procedure advances to step S208, and it is judged whether or not a prescribed time period, t, has elapsed since the start of printing or the previous discharge for the purposes of discharge determination. If the prescribed time period t has elapsed, then at the next step S210, a discharge for discharge determination is performed from the first sub nozzle 52. Similarly to the first embodiment, this discharge is performed onto the electrode plate 62a of the discharge determination device 60.

Subsequently, at step S212, the presence or absence of discharge from the sub nozzle 52 that has just performed discharge is determined by the determination circuit 64 of the discharge determination device 60. If a discharge has actually been performed ("discharge OK" status) as shown by the white circle at the position of the first sub nozzle 52 at time t in FIG. 11, then at step S214, the index, k, which indicates the number of the sub nozzle 52 used to perform a discharge for discharge determination, is incremented by 1, and at step S216, the value of the index k is compared with the number, n, of sub nozzles 52 currently used for discharge determination, and if k≦n, then the procedure returns to step S206, and image recording by the main nozzles 51 is continued.

Furthermore, at step S216, if the relationship k≦n is not established, in other words, if k>n, then there are no more sub nozzles 52 which can be used for discharge determination. Therefore, the procedure returns to step S204, the index k is reset to 1, and discharge determination is performed in sequence, starting again from the first sub nozzle 52.

If k≦n is established at step S216, then when the procedure returns to step S206, if there is still print data at step S206, the procedure advances to step S208, where it is judged whether or not the prescribed time period t has elapsed again since the previous discharge for discharge determination performed by the first sub nozzle 52.

If the time period of t has elapsed since the previous discharge for discharge determination performed by the first sub nozzle 52 (in other words, if a time period of 2 t has elapsed since the start of printing), then at the next step S210, a discharge for discharge determination is performed from the second sub nozzle 52 when the time period of 2 t has elapsed from the start of printing. In contrast to the first embodiment described above, rather than performing discharge from the second sub nozzle 52 only when the time period of 2 t has elapsed, it is also possible to discharge ink simultaneously from the first sub nozzle 52 which performed discharge previously. However, the discharge from the first sub nozzle performed here is not used to determine discharge, but rather serves to prevent increased viscosity and to maintain the nozzle in an initial state at all times. At the position of time period 2 t in FIG. 11, the white circle indicates that the discharge of the second sub nozzle 52 for discharge determination is "OK", and the white triangle indicates a simple discharge of the first sub nozzle 52 for maintaining its status.

In this way, a sub nozzle 52 which has already performed discharge for discharge determination repeatedly performs a simple discharge simultaneously with the discharge for discharge determination performed by subsequent sub nozzles 52 in the sequence.

At step S212, if is confirmed that ink has been discharged reliably by the second sub nozzle 52 that has just performed discharge, then at step S214, the index k is incremented by 1, and at step S216, the index k is compared with the number, n, of sub nozzles 52 currently used for discharge determination. Initially this number n is equal to the number of sub nozzles 52 in one block, namely, M, and hence k does not exceed n and it is judged that k≦n. Therefore, the procedure returns to step S206, and repeats the processing described above.

More specifically, if at the next step S208, a further time period of t has elapsed since the discharge for discharge determination from the second sub nozzle 52, (namely, if a time period of 3 t has elapsed since the start of printing), then at step S210, a discharge for discharge determination is made from the third sub nozzle 52, while simultaneously, a simple discharge is also made from the first sub nozzle 52 and the second sub nozzle 52.

A discharge for discharge determination is made in this way until the k−1th sub nozzle 52, and in FIG. 11, it is supposed that the determination result for the k−1th sub nozzle 52 is "discharge OK" as indicated by the white circle. In this case, the sub nozzles 52 from the first to the k−2th sub nozzles 52 perform simple discharge simultaneously with the discharge for discharge determination performed by the k−1th sub nozzle 52, as indicated by the white triangles in FIG. 11.

Next, at step S214, the index k (currently k−1) is incremented by 1 (to become k), and when it is judged that k≦n at step S216, the procedure returns to step S206. If there remains print data, then if it is judged at the next step, S208, that a time period t has elapsed since the previous discharge (namely, the discharge for discharge determination performed by the k−1th sub nozzle 52), a discharge for discharge determination is performed from the kth sub nozzle 52 at step S210. Of course, in this case, simple discharges are also performed simultaneously from the 1st to k−1th sub nozzles 52.

Next, at step S212, if it is determined that a discharge failure has occurred at the kth sub nozzle 52, as indicated by the black circle in FIG. 11, then at the next step, S218, it is judged whether or not the index k is 1. In other words, it is judged whether or not the discharge failure has occurred in the first sub nozzle 52. If k is not equal to 1, then at the next step, S220, a use prohibited flag is established for the sub nozzles 52 from the kth sub nozzle 52 in which a discharge failure has been determined, up to the Mth sub nozzle 52. Thereafter, these nozzles are not used, as indicated by the cross symbol in FIG. 11. This use prohibition is not released until the nozzles are reset by suctioning, as described below.

In this way, by prohibiting use of the sub nozzles 52 from the kth to the Mth nozzle, the timing of the next purging of the main nozzles 51 continues to be judged by using the k−1 sub nozzles 52 from the 1st to the k−1th sub nozzle.

At the next step, S224, the time interval t of the discharge for discharge determination by the (k−1) sub nozzles 52 in order to judge the timing of the next purging of the main nozzles 51 is set to a time period t1 which is longer than the previous time period (in other words, t1>t). Furthermore, when the procedure comes to this step S224 again after the time interval has been set to t1, the time interval of the discharge for discharge determination by the next sub nozzle 52 is set to a time period, t2, which is greater than t1 (namely, t2>t1). Moreover, when it reaches step S224 again after the time interval has been set to t2, the time interval of the next discharge for discharge determination is set to t3, which is greater than t2 (namely, t3>t2). In this way, subsequently, the time interval between discharges is set to successively larger intervals ti (tn> . . . >ti> . . . >t3>t2>t1>t), each time the procedure passes through step S224.

Furthermore at the following step, S226, the number, n, of sub nozzles 52 used for discharge determination is set to k−1. The procedure then returns to step S204, the index k indicating the sequence of the sub nozzles 52 performing discharge for discharge determination is reset to 1, and judgment of the next purge timing for the main nozzles 51 is started.

This purge timing judgment process is similar to the previous process of judging the first purge timing for the main nozzles 51 using M sub nozzles 52. It differs in that, in this case, the sub nozzles 52 from the kth sub nozzle, where a discharge failure was previously detected, onwards, are not used, and only the k−1 sub nozzles 52 from the 1st to the k−1th sub nozzle are used, and furthermore, in that the time interval for performing discharge for discharge determination from the sub nozzles 52 is set to t1, which is longer than the previous interval of t.

At step S206, it is judged if there is still print data, and if it is judged at step S208 that a time period of t1 has elapsed since the previous purging operation of the main nozzles 51, then a discharge for discharge determination is performed from the first sub nozzle 52 at step S210. At step S212, if the discharge is "OK", as indicated by the white circle for the first sub nozzle 52 at time t1 after purging in FIG. 11, then the index k is incremented by 1 at step S214, and this value of k (which has now become 2) is compared with the number, n, of sub nozzles 52 currently used for discharge determination (which is now equal to n=k−1).

If this comparison indicates that k≦n, then the procedure returns to step S206, the same processing as the foregoing is continued, and at step S210, a discharge for discharge determination is performed from the second sub nozzle 52 when a time period t' has elapsed since the previous discharge for discharge determination from the first sub nozzle 52 (in other words, when a time of 2 t1 has elapsed since purging of the main nozzles 51). Simultaneously with this, a simple discharge is made from the first sub nozzle 52.

In this way, discharge for discharge determination is performed sequentially, from k−1 sub nozzles 52, and if the discharge is judged to be OK at step S212, then the index k is incremented by 1 at step S214. At step S216, if k≦n is not established, in other words, if k>n, then this means that there are no more sub nozzles 52 for performing a discharge for discharge determination, and hence the procedure returns to step S204, the index k is reset to 1, and discharge determination is carried out by using the sub nozzles 52 in sequence, starting again from the first sub nozzle 52.

Furthermore, if a sub nozzle 52 having a certain index value, k, is judged to have produced a discharge failure at step S212, then at the next step, S218, it is judged whether or not k=1. In this case, if k is not equal to 1, for instance, if k=2, the main nozzles 51 are purged in the next step, S220, and at step S222, use of the sub nozzles 52 from the second sub nozzle 52 onwards is prohibited. At step S224, the discharge timing interval t1 for discharge determination is set to a yet longer time period, t2, and at step S226, n is set to n=k−1=2−1=1. The procedure then returns to step S204 and discharge determination is performed using the first sub nozzle 52 only.

Moreover, if it is judged at step S218 that k=1, then this means that there are no more sub nozzles 52 which can be used for discharge determination from the next time onwards. Therefore, the procedure advances to the suction mode in step S228, and all of the main nozzles 51 and the M sub nozzles 52 are restored by suctioning. The suctioning of the main nozzles 51 and the sub nozzles 52 is carried out by covering the whole nozzle surface 50*a* with the cap 54, as illustrated in FIG. 6, and then suctioning with a suction pump 56. This suctioning is carried out independently with respect to each ink common flow channel, in other words, each of the blocks described above.

When the sub nozzles 52 have been restored, the procedure returns to step S202, and the use prohibition flags currently set for the sub nozzles 52 are cancelled. Discharge determination is carried out using the original full number of M sub nozzles 52, and the purge timing for the main nozzles 51 is judged accordingly.

The suctioning of the sub nozzles 52 is performed in accordance with the timing of suctioning of the main nozzles 51, for the purpose of removing air bubbles from the filters in the supply channels, resetting the internal pressure, or the like. Suctioning is carried out independently for each common flow channel, in other words, for each block. In this way, apart from restoration by purging of the main nozzles 51 as judged by means of the sub nozzles 52, the main nozzles 51 are also restored by means of a previously established suctioning operation, and at the suction timing for the main nozzles 51, both the main nozzles 51 and the sub nozzles 52 are suctioned together and thus returned to their initial states. In this case, the subsequent processing starts from the state in step S202 of FIG. 12.

By performing discharge for discharge determination from the sub nozzles 52 and judging discharge failures in this way, image recording is continued while the purge timing for the main nozzles 51 is judged and a restoring process is carried out accordingly. Finally, when it is judged that there is no print data remaining at step S206, then the procedure advances to step S230 and printing ends.

As described above, this second embodiment reduces the frequency at which the sub nozzles 52 enter a reset operation, in comparison with the first embodiment described above, and therefore it allows productivity to be improved further.

Next, a third embodiment of the present invention will be described.

In this third embodiment, a plurality of sets of sub nozzles 52 (for instance, N sets), each set including M sub nozzles 52, are prepared for each block, and the purge timing for the main nozzles 51 is judged by using these sets of sub nozzles 52, sequentially.

Although not illustrated in the drawings, there is no particular restriction on the arrangement of the N sets of sub nozzles 52 each including M sub nozzles 52 on the nozzle surface 50a (see FIG. 5). For example, the M sub nozzles 52 forming each set may be aligned in a row, in such a manner that N rows of sub nozzles 52 are formed.

Figure 13:
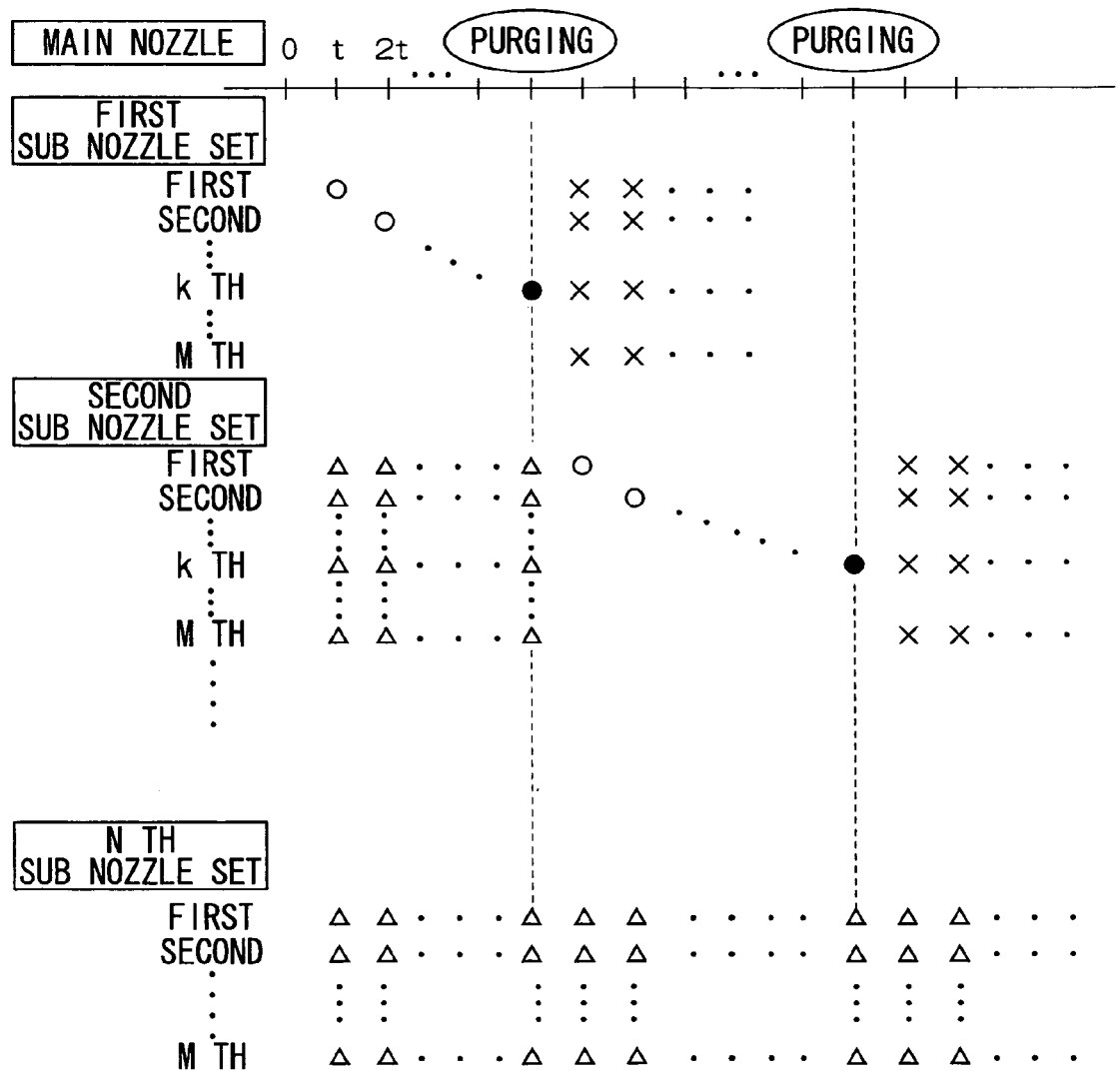
FIG. 13 is a timing chart showing an aspect of discharge determination according to a third embodiment of the present invention.

FIG. 13 shows the discharge timing of the sub nozzles 52 in a nozzle restoring method relating to the third embodiment.

As shown in FIG. 13, the judgment of the initial purge timing for the main nozzles 51 is made by using the first sub nozzle set. The judgment method employed is substantially the same as that depicted in FIG. 9, discharge for discharge determination being performed at prescribed intervals, t, from the sub nozzles 52 of the first sub nozzle set, sequentially, starting from the first sub nozzle 52. If a discharge failure is determined at the kth sub nozzle 52, for example, then the main nozzles 51 are restored by purging.

In this case, as indicated by the white triangles in FIG. 13, simple discharges which are not used for discharge determination are also made from each of the M sub nozzles 52 of the second to Nth sub nozzle sets, apart from the first sub nozzle set, in order to prevent increased viscosity in the ink and hence maintain the nozzles in their initial states.

After purging the main nozzles 51 on the basis of the result of the discharge determination performed by the first sub nozzle set, the first sub nozzle set becomes unavailable for use, as indicated by the cross symbols in FIG. 13. Thereupon, the next purge timing of the main nozzles 51 is judged by using the second sub nozzle set. In this case, the M sub nozzles 52 in each of the third to Nth sub nozzle sets continue to perform simple discharge as well.

When all of the N sub nozzle sets have been used in this way, all of the sub nozzles 52 are restored by suctioning, and the purge timing for the main nozzles 51 is then judged by performing discharge determination using the first sub nozzle set, as initially.

According to this example, a greater number of sub nozzles are used, but the number of restoring processes for the sub nozzle sets is reduced. Furthermore, although it is necessary to perform simple discharges from the sub nozzle sets which are not used for discharge determination, since the sub nozzles 52 have a small diameter and the number of sub nozzles 52 is less than the number of main nozzles 51, the amount of ink consumed by the simple discharges does not present a significant problem.

Various embodiments of the invention are described above, and according to these embodiments, wasteful consumption of ink is reduced by avoiding unnecessary purging of the main nozzles, while at the same time, discharge determination is carried out during image recording, and consequently there is no decline in productivity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:
a liquid droplet discharge head which has a plurality of first nozzles that discharge liquid droplets onto a recording medium to perform an image recording, and has a plurality of second nozzles which are a distinct set of nozzles from the plurality of first nozzles and are not used for the image recording, the plurality of second nozzles discharging liquid droplets for discharge determination under previously established prescribed discharge conditions during the image recording by the plurality of first nozzles;
a discharge determination device which determines a liquid droplet discharge status of the plurality of second nozzles during the image recording by the plurality of first nozzles; and
a restoration control device which controls a timing during the image recording by the plurality of first nozzles, at which a restoring process is carried out with respect to the plurality of first nozzles according to a determination result obtained by the discharge determination device.

2. The image forming apparatus as defined in claim 1, wherein the prescribed discharge conditions include that a diameter of the plurality of second nozzles is smaller than a diameter of the plurality of first nozzles.

3. The image forming apparatus as defined in claim 1, wherein the prescribed discharge conditions include that an amplitude of a drive waveform which drives the plurality of second nozzles is smaller than an amplitude of a drive waveform which drives the plurality of first nozzles.

4. The image forming apparatus as defined in claim 1, wherein the prescribed discharge conditions include that a rise time of a drive waveform which drives the plurality of second nozzles is longer than a rise time of a drive waveform which drives the plurality of first nozzles.

5. The image forming apparatus as defined in claim 1, wherein the plurality of second nozzles are fewer in number than the plurality of first nozzles.

6. The image forming apparatus as defined in claim 1, wherein the plurality of second nozzles discharge the liquid droplets onto the discharge determination device under the prescribed discharge conditions.

7. A nozzle restoring method for a plurality of image recording nozzles that discharge liquid droplets onto a recording medium to perform an image recording, and a plurality of discharge determination nozzles which are a distinct set of nozzles from the plurality of image recording nozzles and are not used for the image recording, the plurality of discharge determination nozzles discharging liquid droplets for discharge determination under prescribed discharge conditions during the image recording by the plurality of image recording nozzles, the method comprising the steps of:
discharging the liquid droplets from each of the plurality of discharge determination nozzles sequentially one at a time at prescribed time intervals under the prescribed discharge conditions during the image recording by the image recording nozzles; and performing a nozzle restoring process during the image recording by the plurality of image recording nozzles, for at least one of the plurality of image recording nozzles and for at least one of the plurality of discharge determination nozzles according to a determination result of a discharge status of the discharge determination nozzles.

8. A nozzle restoring method for a plurality of image recording nozzles that discharge liquid droplets onto a recording medium to perform an image recording, and a plurality of discharge determination nozzles which are a distinct set of nozzles from the plurality of image recording nozzles and are not used for the image recording, the plurality of discharge determination nozzles discharging liquid droplets for discharge determination under prescribed discharge conditions during the image recording by the plurality of image recording nozzles, the method comprising the steps of:

starting discharge from each of the plurality of discharge determination nozzles sequentially one at a time at prescribed time intervals during the image recording by the image recording nozzles;

causing the plurality of discharge determination nozzles that have already started discharge to continue to perform discharge at the prescribed time intervals;

if one of the plurality of discharge determination nozzles that has attempted to start discharge at any part of sequence is determined to suffer a discharge failure, implementing a restoring process during the image recording by the plurality of image recording nozzles, for the plurality of image recording nozzles and controlling a timing for implementing a restoring process for the plurality of image recording nozzles as previously by using only the discharge determination nozzles that have continued to perform discharge prior to the one of the plurality of discharge determination nozzles determined to have suffered the discharge failure; and implementing a restoring process during the image recording by the plurality of image recording nozzles, for the plurality of discharge determination nozzles in cases where it has become impossible to determine discharge failures by means of the plurality of discharge determination nozzles.

\* \* \* \* \*